US008237317B2

(12) United States Patent
Bochen et al.

(10) Patent No.: US 8,237,317 B2

(45) Date of Patent: Aug. 7, 2012

(54) DRIVING DEVICE

(75) Inventors: Marian Bochen, Eitelborn (DE); Rolf Mintgen, Thuer (DE)

(73) Assignee: Stabilus GmbH, Koblenz (DE)

( * ) Notice: Subject to any disclaimer, the term of this patent is extended or adjusted under 35 U.S.C. 154(b) by 558 days.

(21) Appl. No.: 12/476,481

(22) Filed: Jun. 2, 2009

(65) Prior Publication Data

US 2009/0320627 A1 Dec. 31, 2009

(30) Foreign Application Priority Data

Jun. 25, 2008 (DE) ........................ 10 2008 030 247

(51) Int. Cl.
*H02K 11/00* (2006.01)
*E05F 15/10* (2006.01)

(52) U.S. Cl. ...... 310/66; 310/67 R; 310/68 R; 74/89.23; 49/340

(58) Field of Classification Search ........... 74/89, 89.23, 74/89.25, 89.32, 89.34; 49/340, 344; 296/146.4; 310/80, 67 R, 68 D, 68 R, 66, 89; 323/201
See application file for complete search history.

(56) References Cited

U.S. PATENT DOCUMENTS 2,283,476 A * 5/1942 Waibel .......................... 192/141
4,467,250 A * 8/1984 Thomasson ................... 318/436
4,712,770 A * 12/1987 Wiederkehr .................... 254/98
4,779,031 A * 10/1988 Arends et al. ................. 318/565
5,187,993 A * 2/1993 Nicholson et al. ........... 74/89.38
5,491,370 A * 2/1996 Schneider et al. .............. 310/54
5,698,918 A * 12/1997 Shinoda et al. ................. 310/89
6,078,117 A * 6/2000 Perrin et al. ................ 310/68 R
6,232,684 B1 * 5/2001 Haag et al. .................. 310/68 R
7,000,353 B2 * 2/2006 Bosio .............................. 49/139
7,301,251 B2 * 11/2007 Cara et al. ........................ 310/71
2006/0196293 A1 * 9/2006 Gerhardt .................... 74/424.92
2007/0062119 A1 * 3/2007 Ritter .............................. 49/343
2008/0018184 A1 * 1/2008 Seufert et al. ............... 310/68 B
2008/0050099 A1 * 2/2008 Bi et al. ........................ 388/804
2009/0120003 A1 * 5/2009 Bochen et al. .................. 49/340

FOREIGN PATENT DOCUMENTS

GB 2032194 * 4/1980
JP 2004-153897 * 5/2004

* cited by examiner

*Primary Examiner* — Burton Mullins
(74) *Attorney, Agent, or Firm* — Cozon O'Connor

(57) ABSTRACT

A device for moving a movable structural component with respect to a stationary structural component includes a first fastening element which can be fastened to the movable structural component, and a housing tube having a second fastening element which can be fastened to the stationary structural component. A spindle drive for moving the first fastening element axially relative to the housing between an extended position and a retracted position includes a spindle nut arranged on a threaded spindle. An electric motor arranged in the housing tube drives one of the spindle nut and the threaded spindle in rotation. A power supply for supplying power to the electric motor includes a power output stage arranged in the housing tube, wherein the power output stage is shielded from electrical and magnetic fields.

13 Claims, 3 Drawing Sheets

DRIVING DEVICE

BACKGROUND OF THE INVENTION

1. Field of the Invention

The invention is directed to a driving device, particularly for a hatch in a vehicle, with a first fastening element which can be connected to a stationary structural component part or to a movable structural component part, and with a housing tube which is movable axially relative to the first fastening element and can be fastened to the other component part. A spindle drive has a spindle nut arranged on a threaded spindle, by which the first fastening element and the housing tube are drivable so as to be movable axially relative to one another between a moved out position and a moved in position, wherein the spindle drive is rotatably drivable by an electric motor drive which is arranged in the housing tube and which is controllable by a control unit having a power output stage.

2. Description of the Related Art

In a driving device of the type mentioned above, it is known to arrange the control unit at a distance from the driving device and to connect it to the driving device by a feed line.

High actuating forces are required particularly in the initial range of the outward stroke which lead to high currents in the feed line. These high currents generate a substantial EMC load which, particularly when the driving device is used in motor vehicles, can lead to problems in the other electrical and electronic equipment in the motor vehicle.

SUMMARY OF THE INVENTION

It is an object of the invention to provide a driving device of the type mentioned above which prevents EMC loads of this kind particularly in the initial range of the outward stroke of the driving device.

According to the invention, this object is met by a power supply to the electric motor drive which includes a power output stage arranged in the housing tube and shielded from electrical and/or magnetic fields.

Since the power output stage is now arranged near the electric motor drive and is also well-shielded, EMC loads emanating from the driving device are prevented at least substantially and the feed line resistance to the electric drive unit is kept low. Uneconomical shielding of the feed lines is not required.

Further, the power supply can include an electric energy storage arranged in the housing tube and/or by an electric voltage amplifier (booster). As a result, the energy storage is switched on in the initial range of the outward stroke and provides temporary high power. Voltage is likewise made available to the electric motor by the electric voltage amplifier by way of the vehicle power supply, which ensures a higher starting torque of the electric motor drive arranged downstream.

Accordingly, the structural dimensions of the driving device can also be kept small through the use of a low-power, compact electric motor drive. However, the electric motor drive can be loaded beyond its nominal rating for short periods of time without being damaged. Blocking currents occurring at the start of the outward stroke are compensated simultaneously and do not lead to a significant loading of the vehicle power supply. There is also a compensation of voltage losses in the feed lines.

When the housing is constructed from a material with high electrical conductivity, particularly a soft-magnetic material, no special shielding elements are required.

When the power output stage and/or the electric voltage amplifier and/or the electric energy storage are/is arranged in series with the electric motor drive, this results in a compact construction and, therefore, small structural dimensions of the driving device.

The power output stage is preferably a pulse width modulation power output stage so that an analog electric motor drive can also be controlled by digital pulses. The power output stage can also be an inverter by means of which a brushless motor can be driven.

The electrical energy storage can be a battery or a capacitor. When the electric energy storage is a double-layer capacitor (supercapacitor), especially high capacitances are additionally available for the initial range of the outward stroke.

To achieve a temporary increase in power of the electric motor drive, the electromotor voltage amplifier can be a DC-DC converter, a diode cascade or a transformer. The diode cascade has the advantage that it generates only low switching losses and can be implemented in a small space.

Further, in a space-saving manner, the rate of rotation and/or rotating direction of the output shaft of the electric motor drive can be acquired by a sensor arrangement, and a corresponding signal can be supplied to the power output stage.

To reduce speed and increase torque, the spindle drive can be rotatably driven by the electromotor rotary drive by means of a gear unit.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
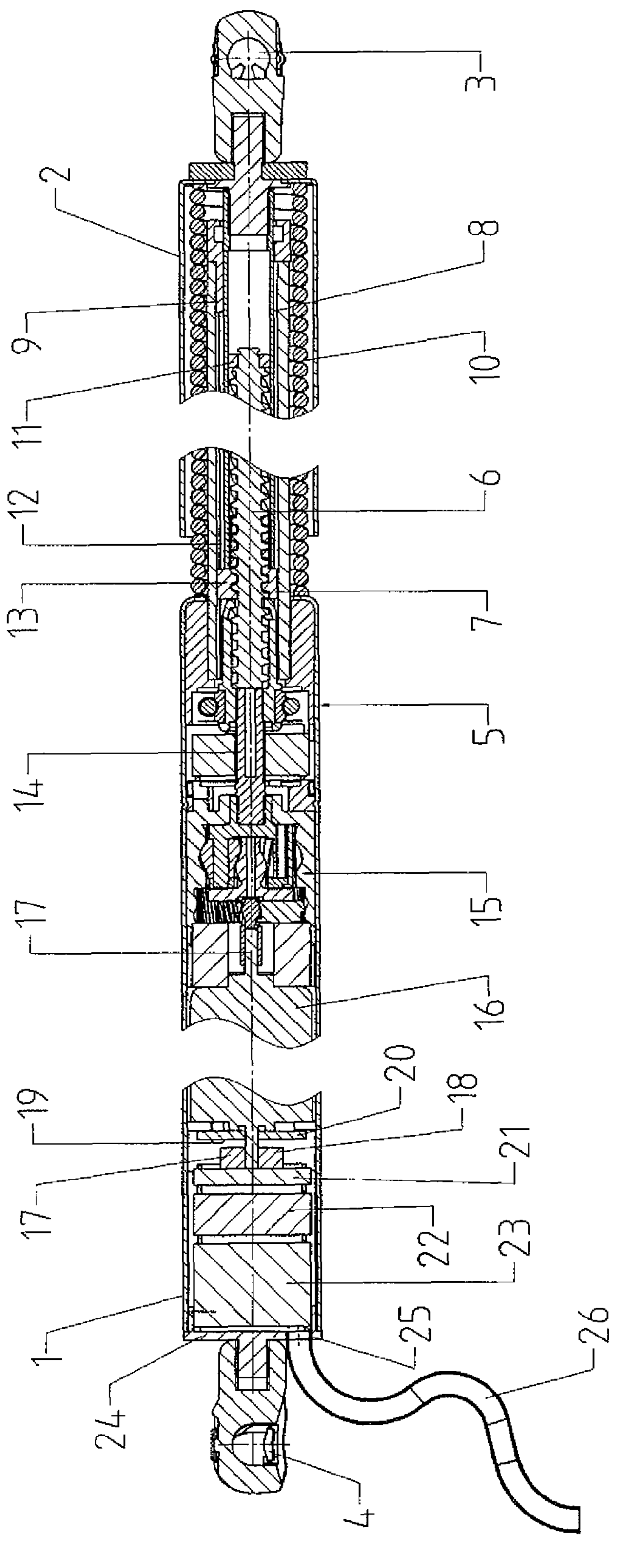
FIG. 1 shows a cross-sectional view of a driving device.
Figure 2:
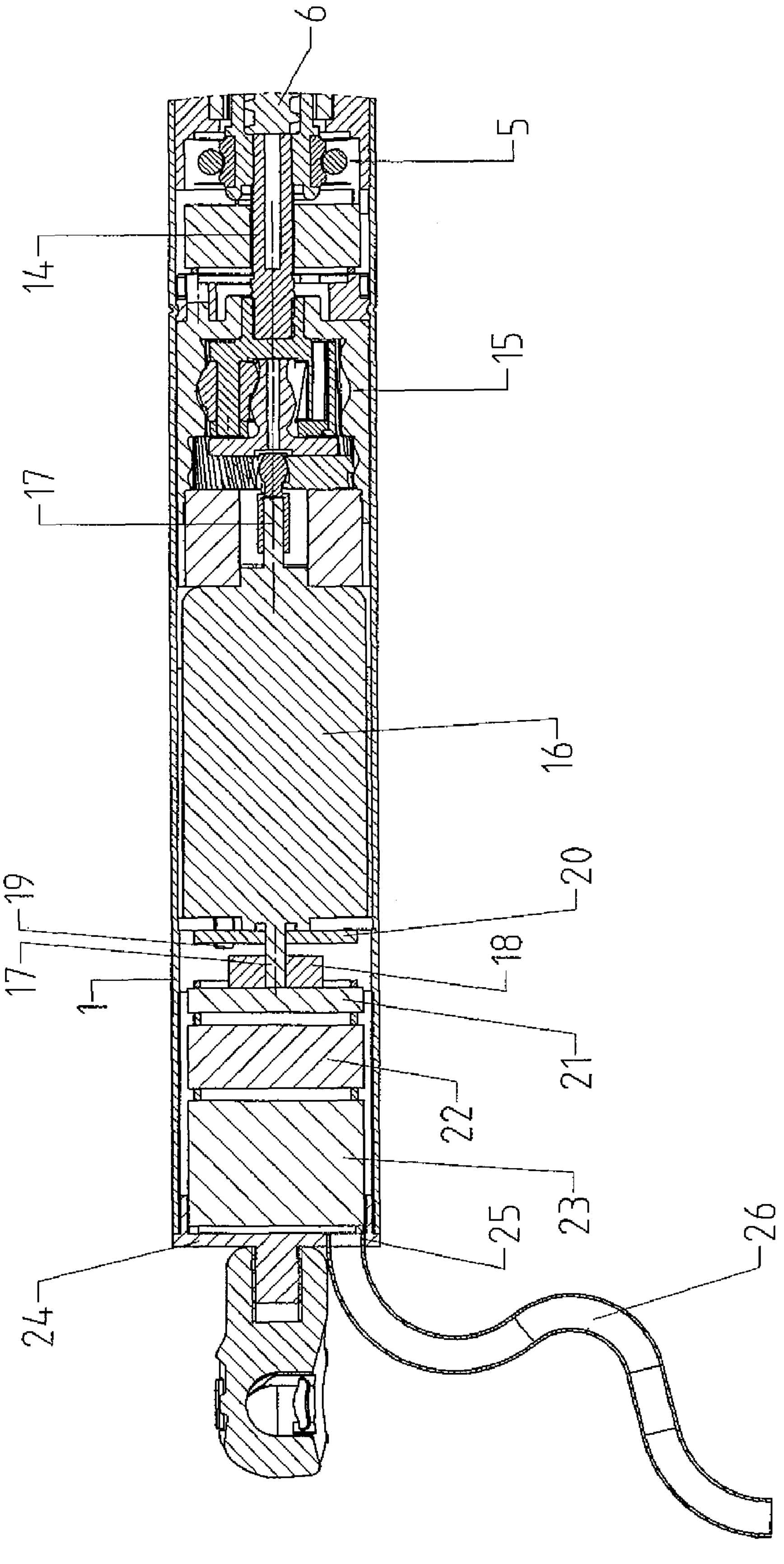
FIG. 2 shows an enlarged view of a portion of the driving device according to FIG. 1.

The driving device shown in the drawings has a housing tube 1 at which an outer tube 2 is guided so as to be displaceable in a telescoping manner.

A first ball socket 3 is arranged at the end of the outer tube 2 located opposite to the housing tube 1, and a second ball socket 4 is arranged at the end of the housing tube 1 located opposite to the outer tube 2. The driving device can be connected in an articulated manner to a stationary structural component part of the body of a motor vehicle and to a movable structural component part of the motor vehicle constructed as a hatch by means of the first and second ball sockets 3 and 4.

A bearing 5 is fixedly installed in the end area of the housing tube facing the outer tube 2, one end of a threaded spindle 6 projecting coaxially into the outer tube 2 being rotatably supported at this bearing 5. The threaded spindle 6 is supported axially by means of the bearing 5.

A spindle nut 7 is arranged on the threaded spindle 6 so as to be fixed with respect to rotation relative to the housing tube 1. The spindle nut 7 is connected to one end of a spindle tube 8 which surrounds the threaded spindle 6 coaxially, the first ball socket 3 being fixedly arranged at its other end. The spindle nut 7 is guided in an axially displaceable manner in a guide tube 9 surrounding the spindle tube 8, this guide tube 9 being fixedly connected to the housing tube 1.

A helical compression spring 10 is arranged in the annular gap between the guide tube 9 and the outer tube 2 surrounding the latter at a distance radially and is supported axially by one end at the outer tube 2 in the area of the first ball socket 3 and by its other end at the housing tube 1.

The threaded spindle 6 has a guide sleeve 11 at its end facing the first ball socket 3 and is guided by its cylindrical outer surface so as to be axially displaceable in the spindle tube 8.

The guide tube 9 has axial slots 12 extending substantially along its length. Corresponding to the axial slots 12, radially projecting supporting pins 13 are arranged at the spindle nut 7 and project into the axial slots 12 radially so as to ensure that the spindle nut 7 is fixed with respect to rotation relative to the guide tube 9.

A driven shaft 14 of a gear unit 15 is connected coaxially to the threaded spindle 6 so as to be fixed with respect to rotation relative to it. The gear unit 15 can be driven rotatably by means of the output shaft 17 of an electric motor 16. The output shaft 17 also projects out of the electric motor 16 on the side remote of the gear unit 15 and has at its free end a permanent magnet 18 which is located axially opposite to a sensor board 20 of a rate of rotation and rotating direction sensor arrangement 28, this sensor board 20 being arranged in a stationary manner and having a Hall element 19.

On the side of the electric motor 16 facing the second ball socket 4 following the rate of rotation and rotating direction sensor arrangement, a control unit 21 with a pulse width modulation power output stage or an inverter power output stage, an electric voltage amplifier 22, and an electric energy storage 23 are arranged coaxial to the electric motor 16 in the housing tube 1, which is made of a soft-magnetic material. The closing cover 24 of the housing tube 1 carrying the second ball socket 4 is likewise made of a soft-magnetic material so that the components located in the housing tube 1 are shielded outwardly against electrical and magnetic fields.

A feed line 26 is guided through an opening 25 of the closing cover 24 and connects the energy storage 23, the voltage amplifier 22, the control unit 21 and the electric motor 16 to a power source, in particular a car battery.

Figure 3:
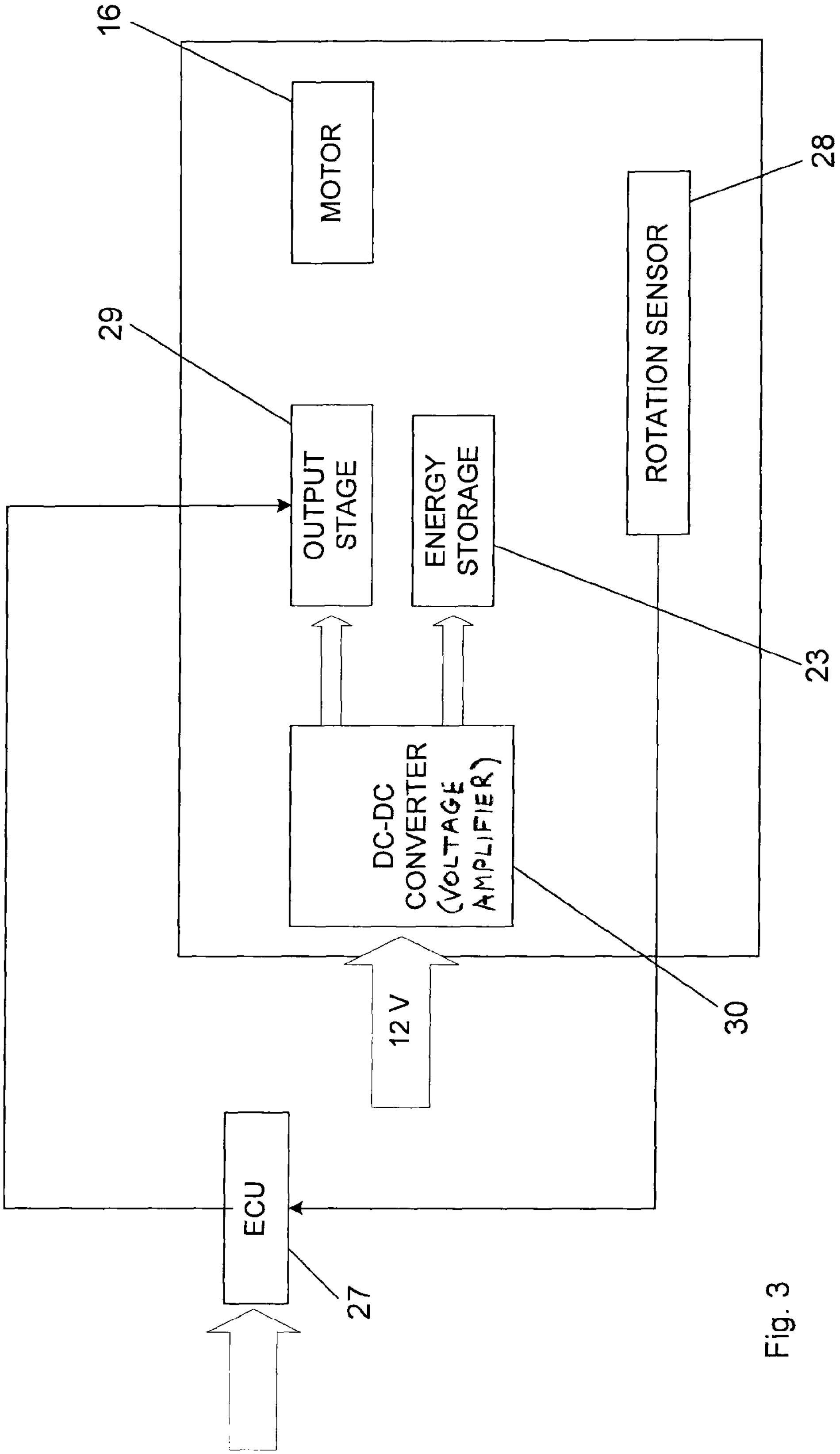
FIG. 3 is a block diagram depicting a drive of the driving device according to FIG. 1.

The block diagram shown in FIG. 3 shows an engine control unit 27 (ECU) which is supplied with a DC voltage of 12 V by a battery, not shown. Further, signals are fed to the engine control unit 27 from a rate of rotation and rotating direction sensor arrangement 28. Control signals are supplied by the engine control unit 27 to a pulse width modulation power output stage 29 and control an electric motor 16 in a corresponding manner.

In order to supply the electric motor 16 with a voltage higher than the vehicle power supply voltage of 12 V, the DC voltage of 12 V which is provided by a battery is increased, for example, to 24 V in a voltage amplifier constructed as a DC-DC converter 30 and is supplied to the electric motor 16 either directly or by means of an energy storage 23 and the pulse width modulation power output stage 29.

The invention is not limited by the embodiments described above which are presented as examples only but can be modified in various ways within the scope of protection defined by the appended patent claims.

We claim:

1. A device for moving a movable structural component with respect to a stationary structural component, the apparatus comprising:

- a first fastening element which can be fastened to one of the stationary structural component and the movable structural component;
- a housing tube which is axially movable relative to the first fastening element, the housing tube having a second fastening element which can be fastened to the other of the stationary structural component and the movable structural component;
- a spindle drive for moving the first fastening element axially relative to the housing between an extended position and a retracted position, the spindle drive comprising a spindle nut arranged on a threaded spindle;
- an electric motor arranged in the housing tube for driving one of the spindle nut and the threaded spindle in rotation; and
- a power supply for supplying power to the electric motor, the power supply comprising a power output stage arranged in the housing tube, a voltage amplifier arranged in the housing tube, wherein the power output stage is shielded from electrical and magnetic fields, and wherein the voltage amplifier, the power output stage and the electric motor are arranged in series.

2. The device of claim 1 wherein the housing tube is made of a soft magnetic material.

3. The device of claim 1 wherein the power output stage is a pulse width modulation power output stage.

4. The device of claim 1 wherein the power output stage is an inverter, and the electric motor is a brushless motor.

5. The device of claim 1 wherein the voltage amplifier is a DC-DC converter.

6. The device of claim 1 wherein the voltage amplifier is a diode cascade.

7. The device of claim 1 wherein the voltage amplifier is a transformer.

8. The device of claim 1 wherein the electric motor has an output shaft, the device further comprising a sensor for detecting at least one of rate of rotation and rotating direction of the output shaft, the sensor supplying a signal to the power output stage.

9. The device of claim 1 wherein the electric motor has an output shaft, the device further comprising a gear unit arranged between the output shaft and the spindle drive.

10. A device for moving a movable structural component with respect to a stationary structural component, the apparatus comprising:

- a first fastening element which can be fastened to one of the stationary structural component and the movable structural component;
- a housing tube which is axially movable relative to the first fastening element, the housing tube having a second fastening element which can be fastened to the other of the stationary structural component and the movable structural component;
- a spindle drive for moving the first fastening element axially relative to the housing between an extended position and a retracted position, the spindle drive comprising a spindle nut arranged on a threaded spindle;
- an electric motor arranged in the housing tube for driving one of the spindle nut and the threaded spindle in rotation; and
- a power supply for supplying power to the electric motor, the power supply comprising a power output stage arranged in the housing tube a voltage amplifier arranged in the housing tube, wherein the power output stage is shielded from electrical and magnetic fields wherein the power supply further comprises means for storing electrical energy arranged in the housing tube wherein the voltage amplifier, the means for storing electrical energy, the power output stage, and the electric motor are arranged in series.

11. The device of claim 10 wherein the means for storing electrical energy is a battery.

12. The device of claim 10 wherein the means for storing electrical energy is a capacitor.

13. The device of claim 12 wherein the capacitor is a double layer capacitor.

* * * * *